United States Patent [19]

Clemenson

[11] Patent Number: 4,759,394
[45] Date of Patent: Jul. 26, 1988

[54] STUMP CUTTING TOOTH STRUCTURE

[76] Inventor: Lyle J. Clemenson, Box 435, Osseo, Minn. 55369

[21] Appl. No.: 126,471

[22] Filed: Nov. 27, 1987

[51] Int. Cl.4 .................. B27G 13/04; A01G 23/06
[52] U.S. Cl. .................................. 144/235; 144/2 N; 144/241
[58] Field of Search .............. 144/2 N, 218, 233, 234, 144/235, 236, 241; 83/648

[56] References Cited

U.S. PATENT DOCUMENTS 3,732,905  5/1973  Pickel .................................. 144/2 N
4,147,193  4/1979  Kivimaa .............................. 144/235
4,271,879  6/1981  Shivers, Jr. et al. ............... 144/2 N Primary Examiner—W. Donald Bray
Attorney, Agent, or Firm—Leo Gregory

[57] ABSTRACT

A stump cutting tooth structure which includes a rotatable disc having a plurality of teeth in holding members spaced about the periphery there of, each holding member being formed of mating halves mounted upon opposite sides of the disc, the mating halves having open slots in their facing sides, the slots being parallel to the adjacent surface of the disc, the teeth having shank portions disposed in the slots and having head portions extending outwardly there of radially of the disc and being angled to diverge from one another and to be twisted axially of their shank portions outwardly of one another to have their cutting face portions each at an obtuse angle to their respective cutting directions whereby their cutting face portions slice into a stump in their cutting action instead of flatly inpacting the stump.

6 Claims, 2 Drawing Sheets

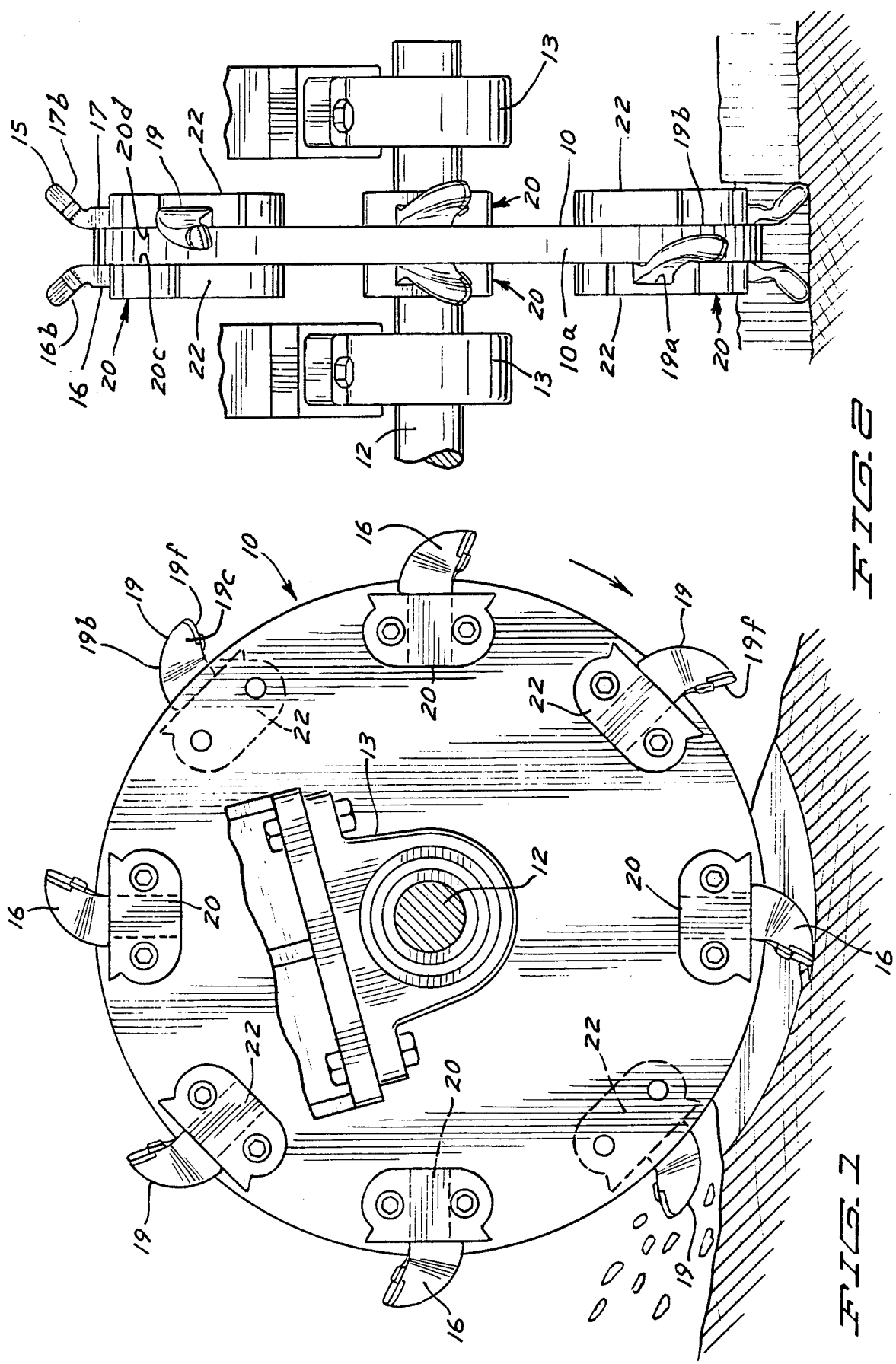

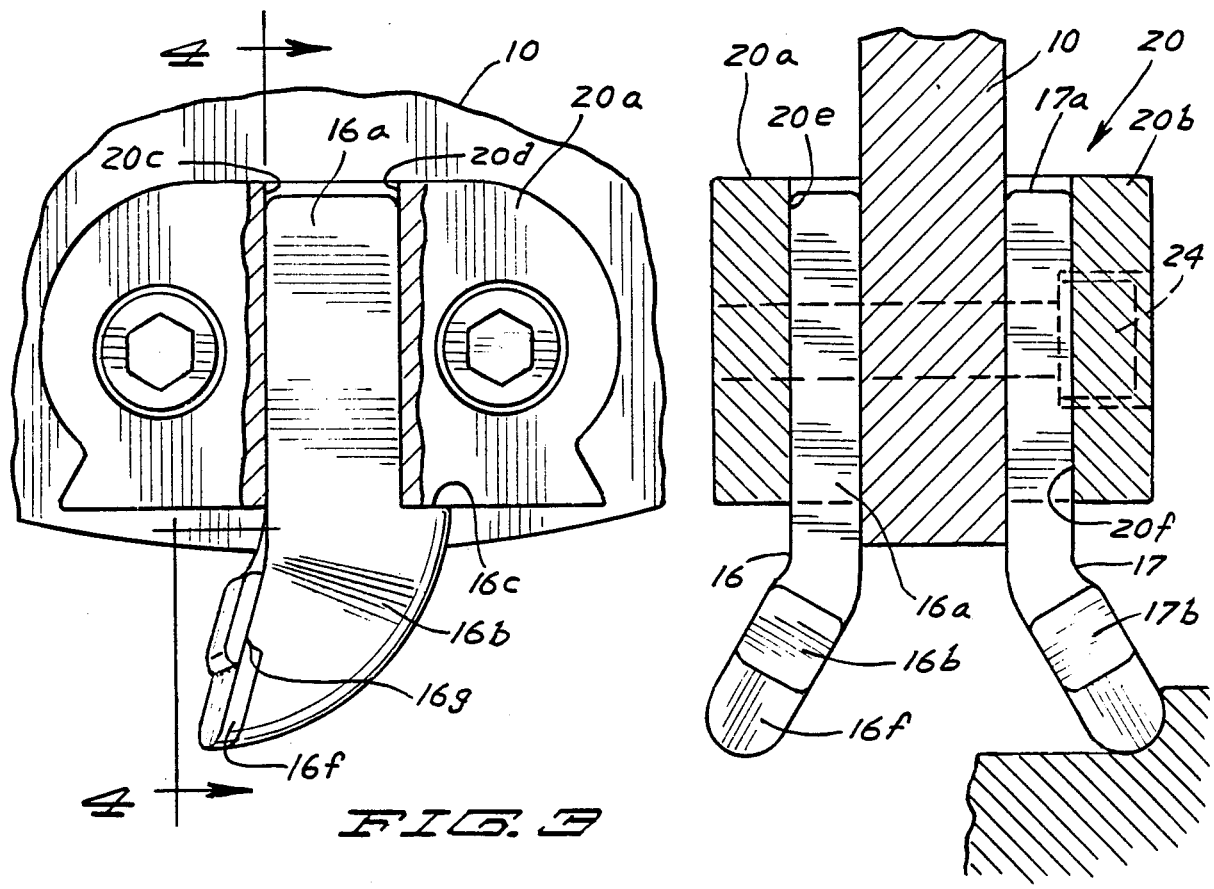
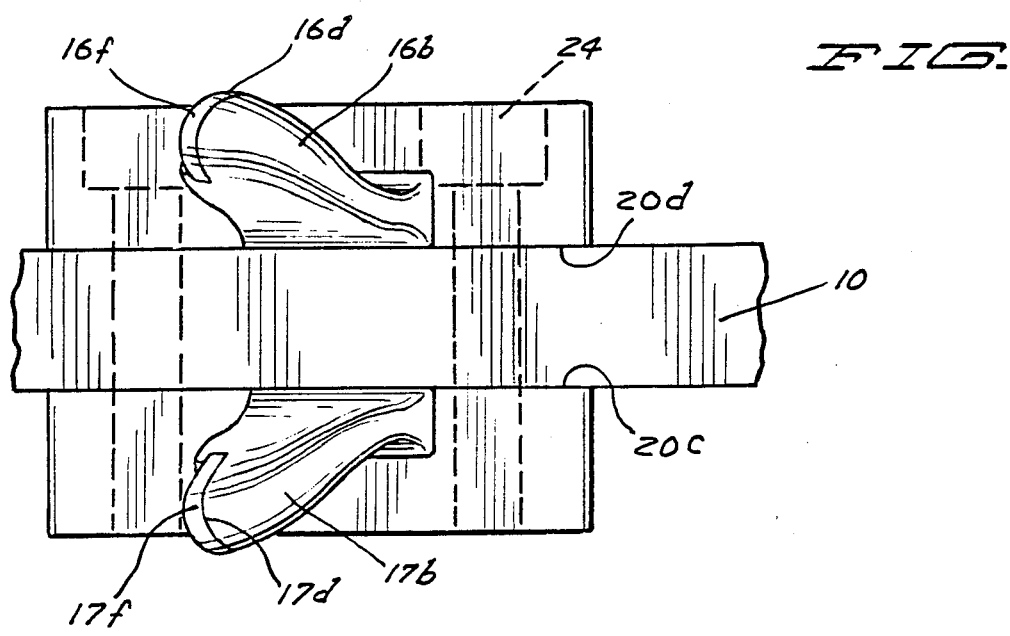

STUMP CUTTING TOOTH STRUCTURE

BACKGROUND OF THE INVENTION

1. Field of Invention

This invention relates to stump cutting teeth.

2. Description of the Previous Art

The structure herein relates particularily to the teeth used in connection with a stump cutting machine and the arrangement of the teeth in being mounted onto a conventional type of a rotating disc, Prior art stump cutting structures are disclosed in U.S. Pat. Nos. 3,797,544 and 3,935,887 to Ploeg in which teeth are planar and are mounted in slots in holders at opposite sides of a disc, the slots being angled relative to the disc and thus the opposed pairs of teeth are angled longitudinally relative to each other. The cutting face of the teeth are disposed to be at right angles to the direction of travel of the teeth to have a flat impacting engagement with a stump.

SUMMARY OF THE INVENTION

It is an object of this invention to provide improvement in mounting stump cutting teeth onto a disc and in positioning the face cutting portions thereof.

It is another object of this invention to provide a mounting holder for stump cutting teeth, the holder having mating halves having facing slots therein, the slots being parallel to the disc member upon which the holders are mounted, the teeth having their shank portions disposed unto said slots and bolts securing said holders to said disc.

It is a further object, with respect to the previous object, to have the head portions of said teeth extend beyond the holders radially of the disc, the head portions being angled transversely of their respective shank portions to diverge laterally from one another and to be twisted axially of their shank portions outwardly of one another to have their cutting faces at an obtuse angle to their respective cutting planes in lieu of a flat impacting engagement with a stump said cutting faces will have an angled cutting or slicing engagement with a stump which requires lesser force to reduce a stump than would otherwise be required.

These and other objects and advantages of the invention will be set forth in the following description made in connection with the accompanying drawings in which the reference characters refer to similar parts throughout the several views.

BRIEF DESCRIPTION OF THE DRAWINGS

FIG. 1 is a view in side elevation with a portion broken away showing a disc with teeth mounted thereon;

FIG. 2 is a view similar to that of FIG. 1 in fromt elevation with some parts being broken away;

FIG. 3 is a fragmentary view in side elevation on an enlarged scale showing a detail of structure;

FIG. 4 is a view in broken vertical section taken on line 4—4 of FIG. 3 as indicated; and FIG. 5 is a view similar to that of FIG. 4 in a bottom plane view.

DESCRIPTION OF A PREFERRED EMBODIMENT

Referring to the drawings and particularily to FIG. 1, a rotatable circular blade or disc member 10 is shown mounted onto a shaft 12, which is journaled into bearing block 13, all of which is a part of a conventional stump removal apparatus of which a further showing is not made and is not required for a full disclosure of the invention herein.

This invention relates to the structure and mounting of coupled pairs of teeth 15 and single mounted teeth 19 onto the periphery of said blade 10.

Said pairs of teeth 15 and the single teeth 19 are mounted upon said blade in an alternating order and the same are respectively disposed into and secured in holders 20 and 22. One set of said teeth 15 and 19 will be described as representative of the others and said others will bear like reference characters.

Referring first to the tooth holder 20, the same is formed of a pair of mating halves 20a and 20b which are substantially parallelepiped in form and which are mounted in opposed positions on either side of said blade 10 adjacent the periphery thereof and are secured to said blade by transverse bolts 24 as shown.

Said mating halves 20a and 20b have flat opposed faces 20c and 20d and formed therein are open sided facing slots 20e and 20f, said slots extending radially of said blade.

Said slots receive the shank portions 16a and 17a of said teeth 16 and 17 and the head portions 16b and 17b of said teeth extend outwardly of said holders radially of said blade. Said slots have a depth slightly less than the thickness of said shank portions for a tight holding engagement.

The head portions as best shown with the head portion 16b of FIG. 3 have an underlying shoulder as at 16c to seat upon the holder 20a to position said tooth in said slot 20e.

A significant element of novelty is present in the particular relationship of the head portions relative to their respective shank portions. The head portions 16b and 17b, as shown in FIGS. 2 and 5 are angled transversely of their respective shank portions to diverge laterally from one another and in diverging are twisted axially of their respective shank portions outwardly from one another to have their respective cutting faces 16d and 17d at an obtuse angle to their respective cutting planes. In lieu of having a flat impacting engagement with a stump, said cutting faces will have an angled cutting or slicing engagement with a stump which requires substantially less force to reduce a stump than in the case of using a straight impacting action.

Said teeth are provided with carbide tips 16f and 17f to assure long lasting sharp cutting edges.

It will be noted in FIG. 3 that a small front opening slot 16g is formed into the face portion of the cutting head 16b to partially receive and secure the carbide tip 16f. The other cutting heads are similarily formed.

The holder 22 is of the same construction as one of the mating halves of the holders 20. The holder 22 is representative of the other like holders which bear the same reference numbers.

The single tooth 19 is of the same construction as the teeth 16 and 17 with one difference. As seen in FIG. 2, said tooth 19 is angled transversely of its shank portions 19a and is twisted axially thereof to extend over the edge 10a of said blade 10.

The cutting face 19c of said tooth 19 is as described in connection with the cutting faces 16d and 17d having an overlying carbide tip 19f.

Said single holders 22 and the teeth therein alternate from one side of the blade 10 to the other in being mounted thereon.

OPERATION

The main cutting effort in reducing a stump is accomplished by the coupled pairs of teeth 16 and 17. The teeth in being spaced apart define a broad kerf and the single teeth 19 in extending over the edge of the blade 10 serve principally to clean out the kerf formed.

The teeth in being angled axially relative to their direction of travel bite into a stump with an angular shearing or slicing action instead of in a direct head on impact action which is the case with prior art stump cutting teeth. With this action, the time required to reduce a stump is substantially decreased and considerably less power or force is required in the cutting effort.

The teeth as mounted herein are readily replaced as may be required.

It will of course be understood that various changes may be made in form, details, arrangement and proportions of the parts without departing from the scope of the invention herein which generally stated, consists in an apparatus capable of carrying out the objects above set forth, in the parts and combination of parts disclosed and defined in the appended claims.

What is claimed is:

1. a stump cutting tooth structure in connection with a rotatable blade, having in combination
   a tooth holder mounted at one side of a circular blade adjacent the periphery thereof,
   said holder having a flat face against said blade,
   said face of said holder having a slot therein radially of said blade, said slot having a bottom wall parallel to the adjacent wall of said blade,
   a cutting tooth having a shank portion and a cutting head portion,
   said shank portion being diposed into said slot,
   said head portion extending outwardly of said slot and radially of said blade,
   said head portion being angled transversely of said shank portion outwardly of said slot,
   said head portion being twisted axially of said shank portion,
   a cutting face formed at the leading tip portion of said cutting head portion,
   said cutting face being disposed to be at an angle obtuse to the direction of the cutting movement of said tooth, and
   means securing said tooth holder to said blade.

2. A stump cutting tooth structure in connection with a rotatable blade, having in combination,
   a tooth holder mounted at each side of a circular blade adjacent the periphery thereof,
   said holders having flat facing sides in opposed relation on said blade,
   each of said sides having a slot therein radially of said blade and the slots having bottom walls parallel to the adjacent side of said blade,
   a pair of opposed cutting teeth having shank portions respectively disposed into said slots,
   said cutting teeth having head portions extending outwardly of said slots radially of said blade,
   said head portions being angled transversely of their respective shank portions and diverging outwardly of one another,
   said head portions being twisted axially of their respective shank portions outwardly of each other,
   a cutting face formed at the leading tip of each of said head portions,
   said cutting faces respectively being disposed to be at angles obtuse to the direction of the cutting movement of said cutting teeth, and
   means securing said tooth holders to said blade, 3. The structure of claim 1, wherein
   said cutting face has a depending stepped rear portion forming a shoulder,
   a cutting tip secured to said face being partialy disposed into said slot of said shoulder, 4. The structure of claim 1, wherein
   said head portion is angled to overlie an adjacent edge portion of said blade, 5. The structure of claim 1, wherein,
   said head portion is angled and twisted relative to its shank portion to overlie an adjacent edge portion of said blade.

6. The structure of claim 1, including
   a second tooth holder mounted onto said blade in opposed relation to said first mentioned tooth holder,
   a third tooth holder mounted onto said blade spaced from said first and second tooth holders and alternating therewith in being spaced about the periphery of said blade.

* * * * *